United States Patent
Swanson

(10) Patent No.: US 11,237,039 B2
(45) Date of Patent: Feb. 1, 2022

(54) COLLAPSIBLE LUGGAGE SCALE ASSEMBLY

(71) Applicant: Gary Swanson, Ellwood City, PA (US)

(72) Inventor: Gary Swanson, Ellwood City, PA (US)

(*) Notice: Subject to any disclaimer, the term of this patent is extended or adjusted under 35 U.S.C. 154(b) by 8 days.

(21) Appl. No.: 16/892,471

(22) Filed: Jun. 4, 2020

(65) Prior Publication Data
US 2021/0381880 A1    Dec. 9, 2021

(51) Int. Cl.
*G01G 21/22* (2006.01)
*G01G 23/37* (2006.01)
*G01G 21/28* (2006.01)

(52) U.S. Cl.
CPC ........... *G01G 21/22* (2013.01); *G01G 21/283* (2013.01); *G01G 23/3728* (2013.01)

(58) Field of Classification Search
CPC ...... G01G 19/44; G01G 21/22; G01G 21/283; G01G 23/3728
See application file for complete search history.

(56) References Cited

U.S. PATENT DOCUMENTS

| | | | |
|---|---|---|---|
| D274,991 S * | 8/1984 | Wirtz | G01G 5/04 177/126 |
| 4,711,313 A * | 12/1987 | Iida | G01G 3/1402 177/127 |
| 4,765,421 A * | 8/1988 | Newton | G01G 3/15 177/127 |
| 5,234,065 A * | 8/1993 | Schmidt | G01G 5/04 177/126 |
| 6,337,446 B1 | 1/2002 | Hulburt | |
| 7,238,895 B2 | 7/2007 | Dittrich | |
| 7,741,569 B2 * | 6/2010 | Lin | G01G 19/44 177/126 |
| 7,763,813 B2 * | 7/2010 | Domel | G01G 23/3728 177/238 |
| 2015/0122555 A1 | 5/2015 | Meeks | |
| 2016/0061648 A1 | 3/2016 | Bergh | |
| 2016/0116327 A1 | 4/2016 | McCaskill | |

* cited by examiner

*Primary Examiner* — Randy W Gibson

(57) ABSTRACT

A collapsible luggage scale assembly includes a panel that has a top side, a bottom side and a perimeter edge extending between the top and bottom sides. The panel includes a plurality of sections pivotally coupled together such that the panel is foldable. A processor is mounted in the panel. A plurality of weight sensors is positioned in the panel such that each section includes one of the weight sensors. The weight sensors each are electrically coupled to the processor. The processor is programmed to receive signals from the weight sensors and determines a weight positioned on the panel. A transmitter is mounted in the panel and is electrically coupled to the processor. The transmitter is configured to wirelessly transmit the weight to a receiver.

6 Claims, 7 Drawing Sheets

COLLAPSIBLE LUGGAGE SCALE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to scale device and more particularly pertains to a new scale device for weighing luggage while being easily storable when not in use.

(2) Description of Related Art Including Information Disclosed Under 37 CFR 1.97 and 1.98

The prior art relates to scale devices in general and more particular to scales used for weighing luggage.

BRIEF SUMMARY OF THE INVENTION

An embodiment of the disclosure meets the needs presented above by generally comprising a panel that has a top side, a bottom side and a perimeter edge extending between the top and bottom sides. The panel includes a plurality of sections pivotally coupled together such that the panel is foldable. The panel has a height that is less than 0.50 inches. The panel has a width dimension and a length dimension. The width and length dimensions of an unfolded condition is twice the width and length dimensions of a folded condition. A processor is mounted in the panel. A plurality of weight sensors is positioned in the panel such that each section includes one of the weight sensors. The weight sensors each are electrically coupled to the processor. The processor is programmed to receive signals from the weight sensors and determines a weight positioned on the panel. A transmitter is mounted in the panel and is electrically coupled to the processor. The transmitter is configured to wirelessly transmit the weight to a receiver.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
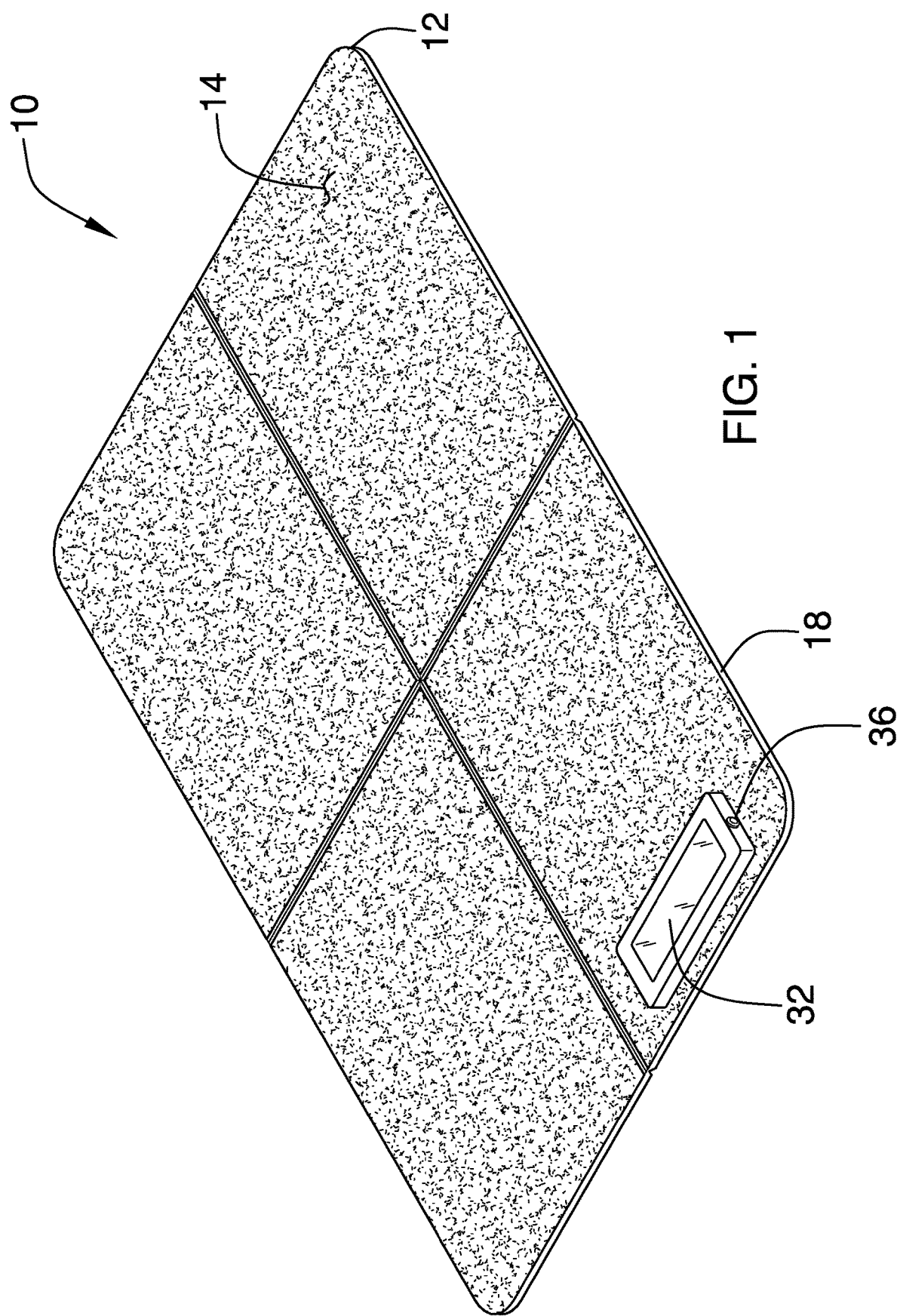
FIG. 1 is a top isometric view of a collapsible luggage scale assembly according to an embodiment of the disclosure.
Figure 2:
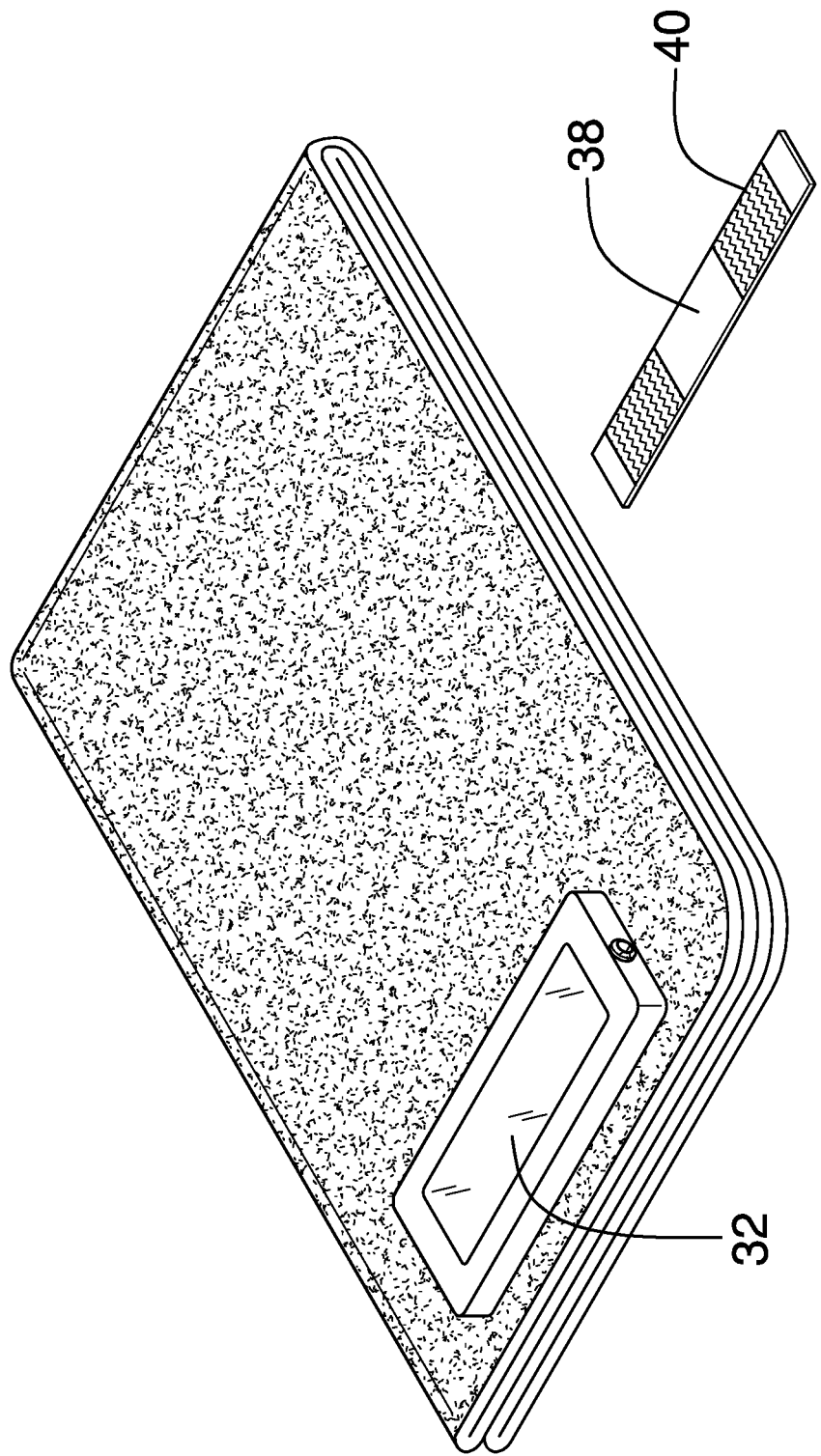
FIG. 2 is a top isometric view of an embodiment of the disclosure.
Figure 3:
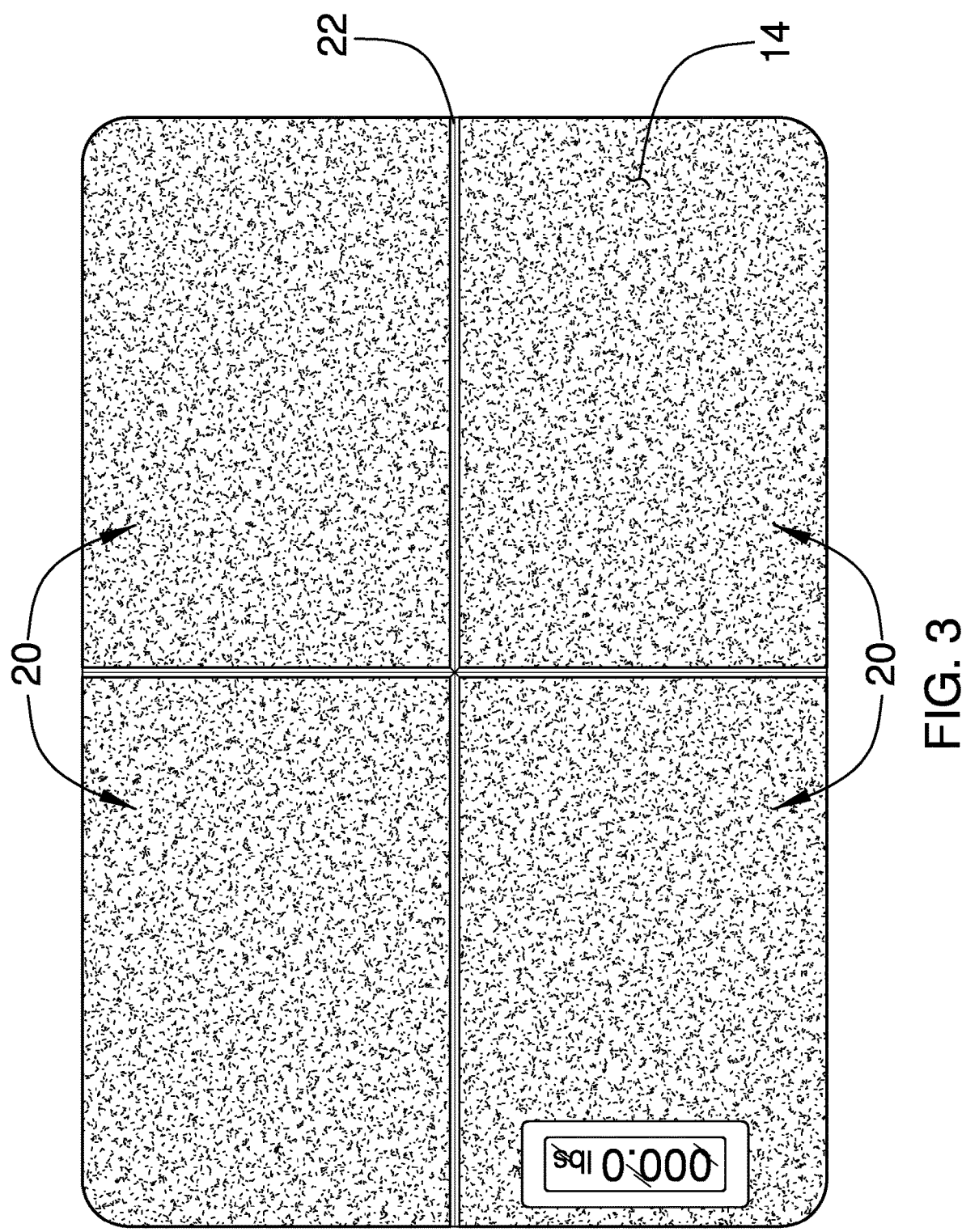
FIG. 3 is a top view of an embodiment of the disclosure.
Figure 4:
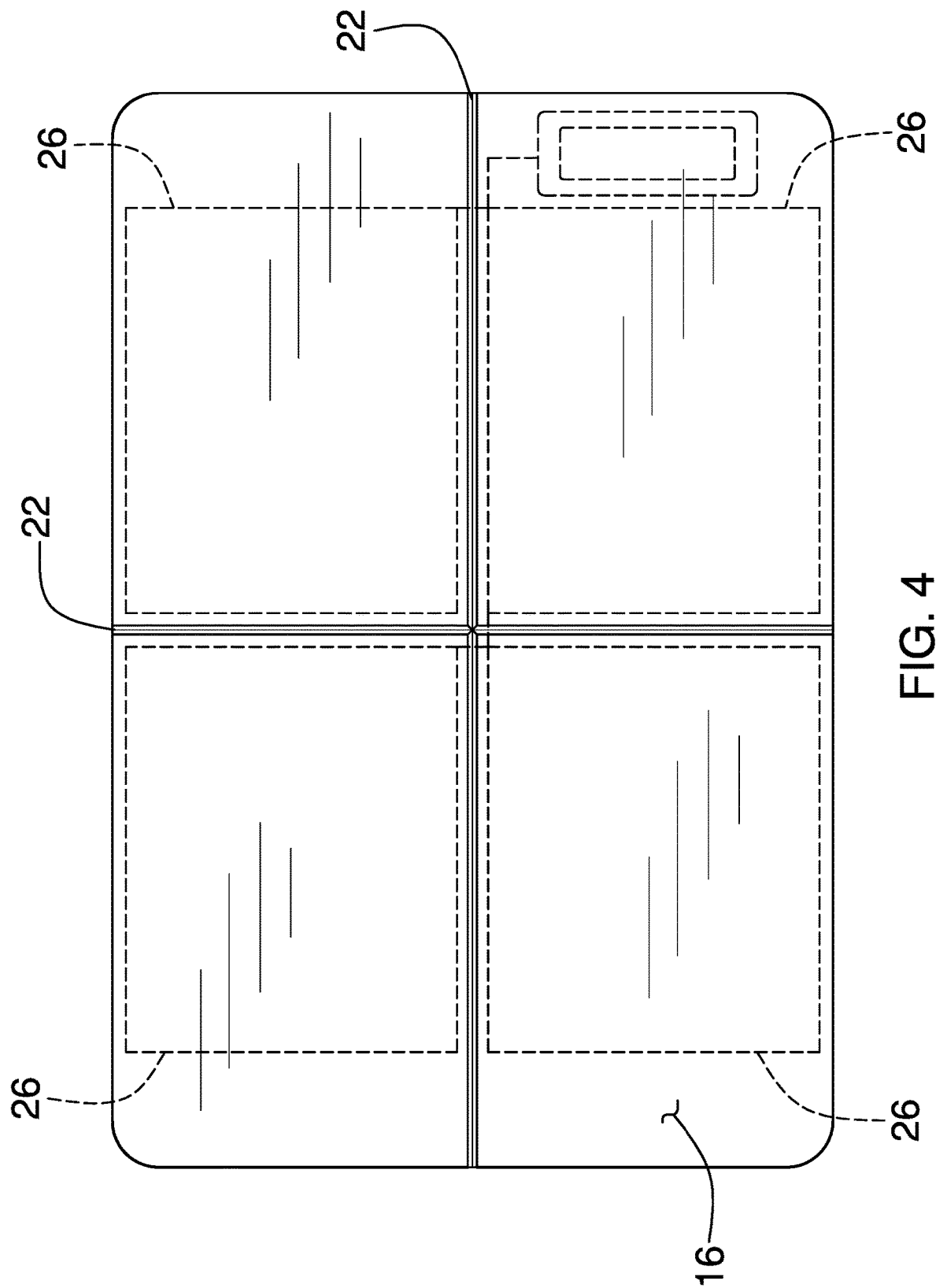
FIG. 4 is a bottom view of an embodiment of the disclosure.
Figure 5:
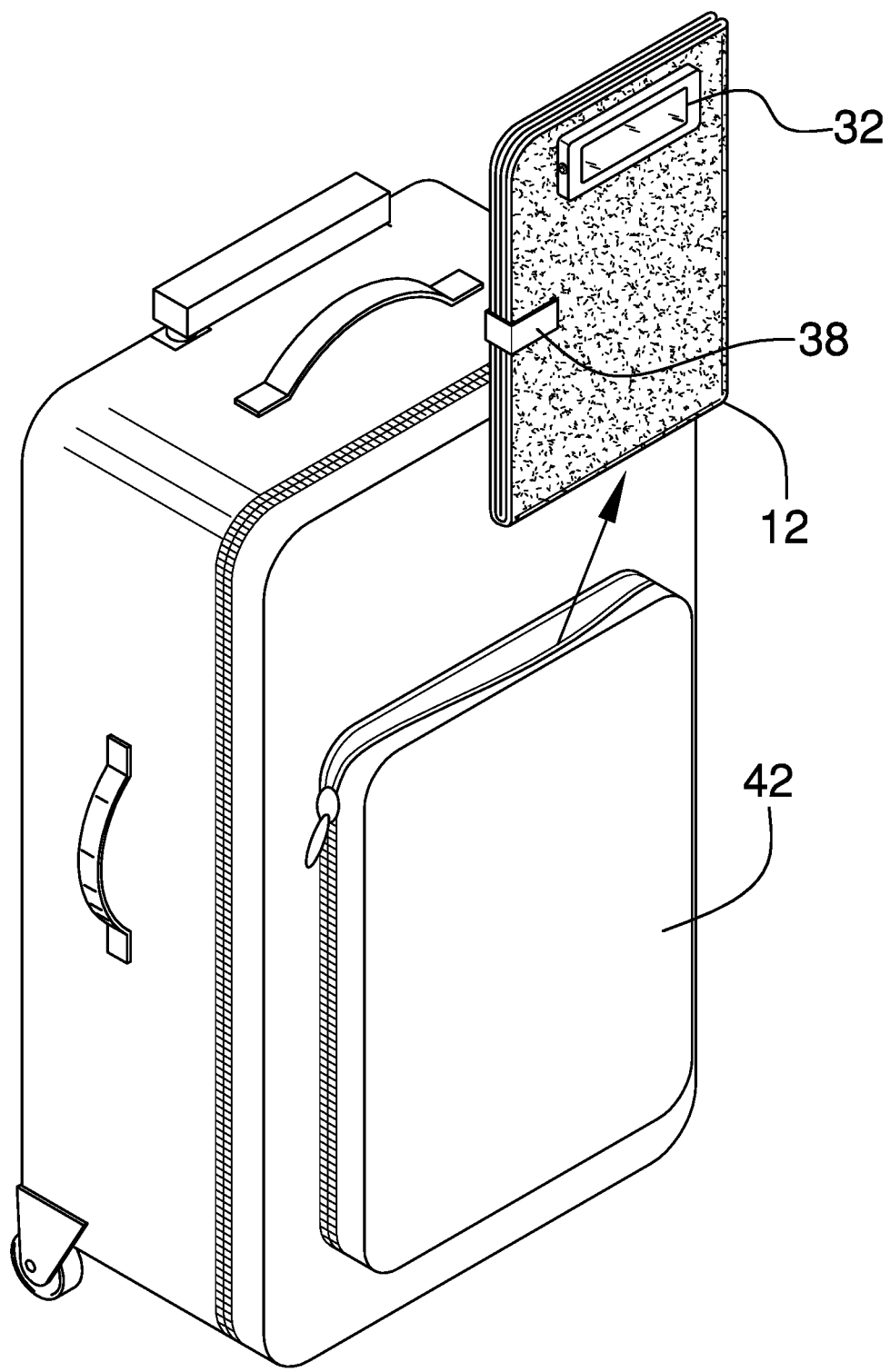
FIG. 5 is a top isometric view of an embodiment of the disclosure.
Figure 6:
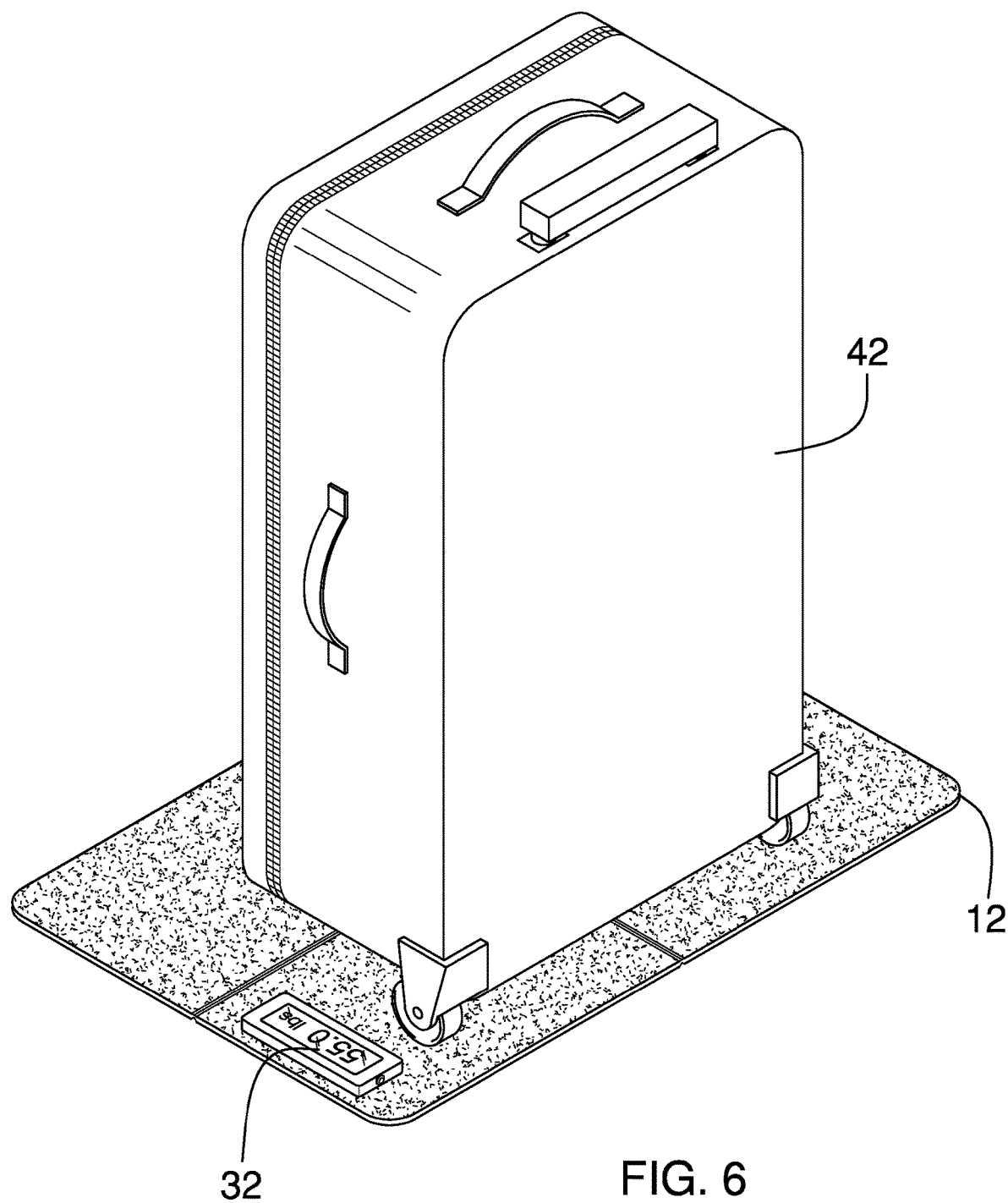
FIG. 6 is a top isometric view of an embodiment of the disclosure.
Figure 7:
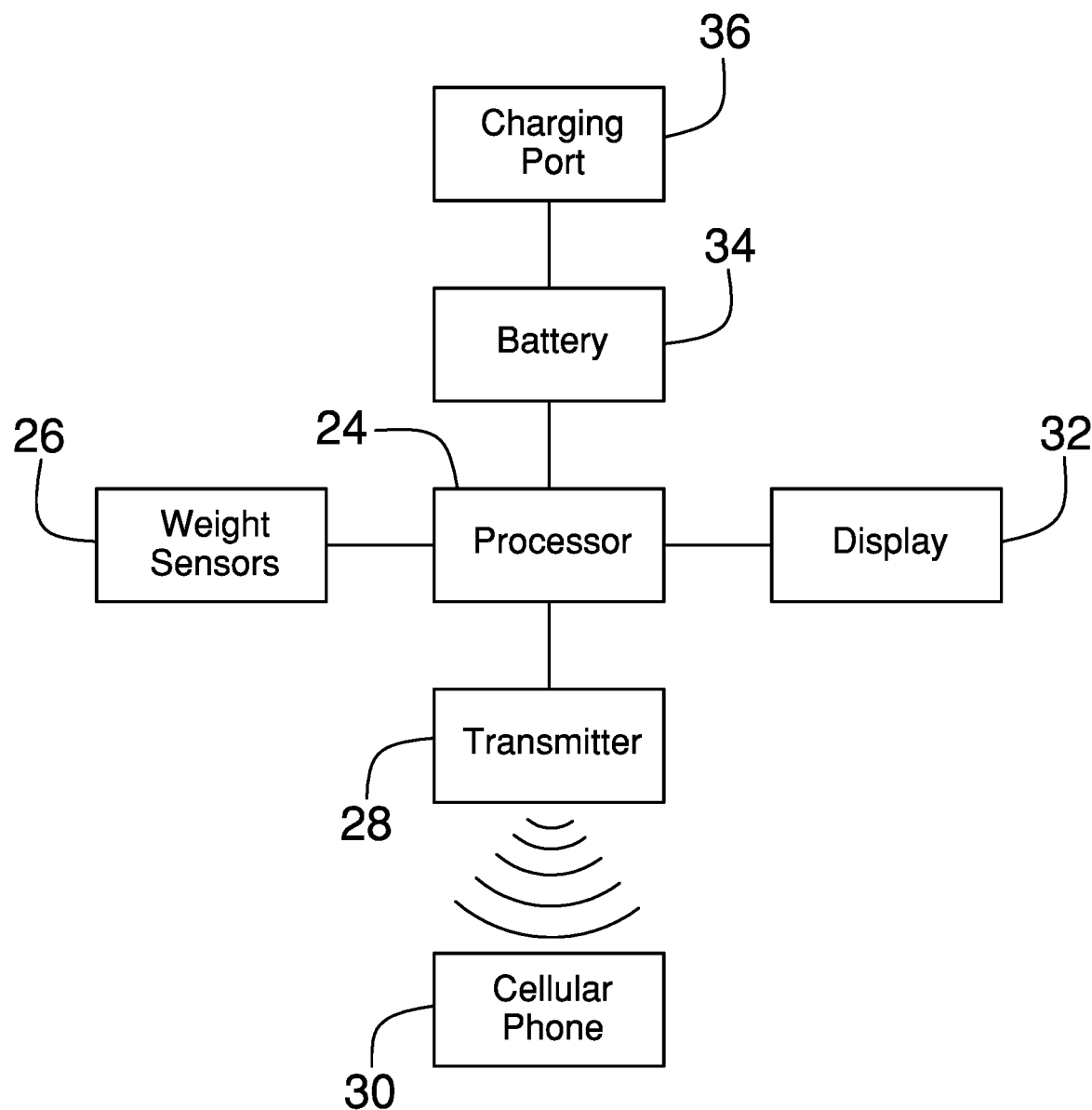
FIG. 7 is a schematic view of an embodiment of the disclosure.

With reference now to the drawings, and in particular to FIGS. 1 through 7 thereof, a new scale device embodying the principles and concepts of an embodiment of the disclosure and generally designated by the reference numeral 10 will be described.

As best illustrated in FIGS. 1 through 7, the collapsible luggage scale assembly 10 generally comprises a panel 12 having a top side 14, a bottom side 16 and a perimeter edge 18 extending between the top 14 and bottom 16 sides. The panel 12 includes a plurality of sections 20 pivotally coupled together such that the panel 12 is foldable. The sections 20 are coupled together by flexible joints 22. However, some of the sections 20 may be un-connected to adjacent ones of the sections 20 to allow the sections 20 to be more easily foldable with respect to each other.

The panel 12 has a height that is less than 0.50 inches and in some embodiments may have a height being less than 0.25 inches. The panel 12 has a width dimension and a length dimension. The width and length dimensions of an unfolded condition are twice the width and length dimensions of a folded condition. Generally, in the unfolded condition the panel 12 has a length between 20.0 inches and 25.0 inches and a width between 13.0 inches and 17.0 inches. In one embodiment, in the unfolded condition, the length is 23.5 inches and the width is 15.75 inches. As can be seen in the Figures, the panel 12 may include four sections.

A processor 24 is mounted in the panel 12 and a plurality of weight sensors 26 is positioned in the panel 12 such that each section 20 includes one of the weight sensors 26. The weight sensors 26 are each electrically coupled to the processor 24. The processor 24 is programmed to receive signals from the weight sensors 26 and determine a weight positioned on the panel 12 in its unfolded condition. The weight sensors 26 may comprise, for example, conventional force transducers utilized in conventional digital scales.

A transmitter 28 is mounted in the panel 12 and is electrically coupled to the processor 24. The transmitter 28 is configured to wirelessly transmit the weight to a receiver. The transmitter 28 may utilize short range communication wireless protocols such as Bluetooth, for example. The receiver will typically be a cellular phone 30 having an application programmed therein which receives the transmission from the transmitter 28 such that the weight may be displayed on, or audibly emitted by, the cellular phone.

Additionally, a display 32 may be mounted on the top side and is electrically coupled to the processor 24. The display 32 is a conventional digital display which displays the weight detected on the panel 12.

A battery 34 is mounted in the panel 12 and is electrically coupled to the processor 24. The battery 34 will typically comprise a rechargeable battery. A charging port 36 is mounted on the panel 12 and is electrically coupled to the battery 34 to recharge the battery 34 as needed.

The top side 14 may be covered with a cloth material which may be engageable with a strap 38 having a hook and loop couplers 40 engageable with the cloth material to retain the panel 12 in the folded configuration. The cloth material may be fluid resistant to inhibit absorption or the passing through of a fluid, such as water, through the cloth material.

In use, the panel 12 is unfolded as needed so that a person may weigh their luggage 42 to ensure that the luggage 42 is under weight limits imposed by an airline. The size of the panel 12 is such that a conventional suitcase will fit on the panel 12 to provide an accurate weigh of the luggage 42. After usage, the panel 12 is folded to facilitate its storage in a pocket of the luggage 42.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

The invention claimed is:

1. A portable scale assembly comprising:
 a panel having a top side, a bottom side and a perimeter edge extending between said top and bottom sides, said panel including a plurality of sections pivotally coupled together such that said panel is foldable, said panel having a height being less than 0.50 inches, said panel having a width dimension and a length dimension, said width and length dimensions of an unfolded condition being twice the width and length dimensions of a folded condition, said top side being covered with cloth material;
 a strap, said strap having hook and loop couplers engageable to said cloth material wherein said strap is engageable to retain said panel in the folded condition;
 a processor being mounted in said panel;
 a plurality of weight sensors being positioned in said panel such that each section includes one of said weight sensors, said weight sensors each being electrically coupled to said processor, said processor being programmed to receive signals from said weight sensors and determining a weight positioned on said panel; and
 a transmitter being mounted in said panel and being electrically coupled to said processor, said transmitter being configured to wirelessly transmit the weight to a receiver.

2. The portable scale assembly according to claim 1, wherein said panel in said unfolded condition has a length between 20.0 inches and 25.0 inches and a width between 13.0 inches and 17.0 inches.

3. The portable scale assembly according to claim 1, further including a display being mounted on said top side and being electrically coupled to said processor, said display displaying said weight.

4. The portable scale assembly according to claim 1, further including a battery mounted in said panel being electrically coupled to said processor, said battery being a rechargeable battery.

5. The portable scale assembly according to claim 4, further including a charging port being mounted on said panel and being electrically coupled to said battery.

6. A portable scale assembly comprising:
 a panel having a top side, a bottom side and a perimeter edge extending between said top and bottom sides, said panel including a plurality of sections pivotally coupled together such that said panel is foldable, said panel having a height being less than 0.50 inches, said panel having a width dimension and a length dimension, said width and length dimensions of an unfolded condition being twice the width and length dimensions of a folded condition, in said unfolded condition said panel having a length between 20.0 inches and 25.0 inches and a width between 13.0 inches and 17.0 inches, said top side being covered with cloth material;
 a strap, said strap having hook and loop couplers engageable to said cloth material wherein said strap is engageable to retain said panel in the folded condition;
 a processor being mounted in said panel;
 a plurality of weight sensors being positioned in said panel such that each section includes one of said weight sensors, said weight sensors each being electrically coupled to said processor, said processor being programmed to receive signals from said weight sensors and determining a weight positioned on said panel;
 a transmitter being mounted in said panel and being electrically coupled to said processor, said transmitter being configured to wirelessly transmit the weight to a receiver; and
 a display being mounted on said top side and being electrically coupled to said processor, said display displaying said weight.

* * * * *